United States Patent

Hara

[19]

[11] Patent Number: 6,081,357
[45] Date of Patent: Jun. 27, 2000

[54] OPTICAL COMMUNICATION NETWORK SYSTEM WITH WAVELENGTH-BASED SIGNAL DISTRIBUTION

[75] Inventor: Yasushi Hara, Tokyo, Japan

[73] Assignee: NEC Corporation, Tokyo, Japan

[21] Appl. No.: 08/897,051

[22] Filed: Jul. 18, 1997

[30] Foreign Application Priority Data

Jul. 19, 1996 [JP] Japan .................................. 8-190194

[51] Int. Cl.[7] .................................................. H04J 14/02
[52] U.S. Cl. ............................................................ 359/124
[58] Field of Search .................................. 359/124, 125, 359/127

[56] References Cited

U.S. PATENT DOCUMENTS

| | | | |
|---|---|---|---|
| 5,319,485 | 6/1994 | Yasui et al. .............................. | 359/124 |
| 5,365,344 | 11/1994 | Eda et al. ................................ | 359/124 |
| 5,400,163 | 3/1995 | Mizuochi et al. ...................... | 359/124 |
| 5,600,466 | 2/1997 | Tsushima et al. ...................... | 359/124 |
| 5,850,301 | 12/1998 | Mizuochi et al. ...................... | 359/124 |

FOREIGN PATENT DOCUMENTS 63-304731  12/1988  Japan .
9-51322    2/1997   Japan .

*Primary Examiner*—Jeffery A. Hofsass
*Assistant Examiner*—John Tweel, Jr.
*Attorney, Agent, or Firm*—Young & Thompson

[57] ABSTRACT

An optical communication network system that communicates by wavelength division multiplexing. The optical network system includes a plurality of communication devices for communicating with one another. At least one of the communication devices is connected as a connection communication device to each of plural multi/demultiplexing devices. A plurality of optical signals are assigned to as assigned optical signals to the communication devices, respectively. The optical signals have wavelengths different from one another, respectively. Each of the optical multi/demultiplexing devices includes a supplying section for supplying the connection communication device with a specific one of the assigned optical signals that is assigned to the communication device. The supplying section may be a bandpass filter for allowing the specific optical signal to pass therethrough and supplies the specific optical signal to the connection communication device.

8 Claims, 6 Drawing Sheets

OPTICAL COMMUNICATION NETWORK SYSTEM WITH WAVELENGTH-BASED SIGNAL DISTRIBUTION

BACKGROUND OF THE INVENTION

This invention relates to an optical communication network system that uses wavelength division multiplexing.

In general, it is known that optical network systems communicate by wavelength division multiplexing. A conventional optical network system comprises first through N-th communication devices each of which is operable as a reception and transmission device. The first through N-th communication devices are connected to one another by at least one optical multi/demultiplexing device. When each of the first through N-th communication devices is operable as the transmission device, the first through the N-th communication devices produce first through N-th optical signals having first through N-th wavelengths, respectively, where N represents a positive integer greater than two.

It will be assumed that an n-th communication device is operable as the reception device, where n is a variable between one and N, both inclusive. From the optical multi/demultiplexing device, the n-th communication device is supplied with remaining optical signals except for an n-th optical signal as will be described later. The n-th communication device selects a selected one of the remaining optical signals that is produced by a transmission communication device which communicates with the n-th communication device.

As described above, the n-th communication device is supplied with the remaining optical signals to select the selected optical signal from the remaining optical signals when the n-th communication device is operable as the reception device. Accordingly, the n-th communication device has a complex structure inasmuch as the n-th communication device must select the selected optical signal from the remaining optical signals. In other words, it is difficult to construct an optical network system comprising a plurality of communication devices each of which has a simple structure.

SUMMARY OF THE INVENTION

It is therefore an object of this invention to provide an optical network system comprising a plurality of communication system each of which has a simple structure.

Other objects of this invention will become clear as the description proceeds.

On describing the gist of this invention, it is possible to understand that an optical network system is for use in carrying out an optical communication by wavelength division multiplexing.

According to a first aspect of this invention, the optical network system comprises a plurality of communication devices for communicating with one another and a plurality of optical multi/demultiplexing devices for connecting the communication devices to one another. A plurality of optical signals are assigned as assigned optical signals to the communication devices, respectively. The optical signals have wavelengths different from one another, respectively. At least one of the communication devices is connected as a connection communication device to each of the multi/demultiplexing devices. Each of the optical multi/demultiplexing devices comprises supplying means for supplying the connection communication device with a specific one of the assigned optical signals that is assigned to the connection communication device.

According to a second aspect of this invention, the optical network system comprises first through M-th optical multi/demultiplexing devices and first through (M+2)-th communication devices, where M represents a positive integer greater than one. The first through the M-th optical multi/demultiplexing devices are connected in cascade to one another in an ascending order. The first optical multi/demultiplexing device is connected to the first and the second communication devices. The second through the (M−1)-th optical multi/demultiplexing devices are connected to the third through the M-th communication devices, respectively. The M-th optical multi/demultiplexing device is connected to the (M+1)-th and the (M+2)-th communication devices. First through (M+2)-th optical signals are assigned to the first through the (M+2)-th communication devices, respectively. The first through the (M+2)-th optical signals have first through (M+2)-th wavelengths different from one another, respectively. The first optical multi/demultiplexing device comprises first supplying means for supplying the first and the second optical signals to the first and the second communication devices, respectively and first distributing means for distributing the first through the (M+2)-th optical signals to the second optical multi/demultiplexing device. A k-th optical multi/demultiplexing device comprises second supplying means for supplying a (k+1)-th optical signal to a (k+1)-th communication device and second distributing means for distributing the first through said (M+2)-th optical signals to (k−1)-th and (k+1)-th optical multi/demultiplexing devices, where k is a variable between two and (M−1), both inclusive. The M-th optical multi/demultiplexing device comprises third supplying means for supplying the (M+1)-th and the (M+2)-th optical signals to the (M+1)-th and the (M+2)-th communication devices, respectively and third distributing means for distributing the first through the (M+2)-th optical signals to the (M−1)-th optical multi/demultiplexing device.

According to a third aspect of this invention, the optical network system comprises a plurality of communication devices for communicating with one another, a plurality of primary optical multi/demultiplexing devices each of which is connected to at least one of the communication devices that is defined as a connection communication device, and at least one subsidiary optical multi/demultiplexing device for connecting the primary optical multi/demultiplexing devices to one another. A plurality of optical signals are assigned as assigned optical signals to the communication devices, respectively. The optical signals have wavelengths different from one another, respectively. Each of the primary optical multi/demultiplexing devices comprises primary supplying means for supplying the connection communication device with a specific one of the assigned optical signals that is assigned to the connection communication device and primary distributing means for distributing the assigned optical signals to a primary adjacent optical multi/demultiplexing device adjacent to each of said primary optical multi/demultiplexing devices. The subsidiary optical multi/demultiplexing devices comprises subsidiary distributing means for distributing the assigned optical signals to a subsidiary adjacent optical multi/demultiplexing device adjacent to the subsidiary optical multi/demultiplexing device.

DESCRIPTION OF THE PREFERRED EMBODIMENTS

Figure 1:
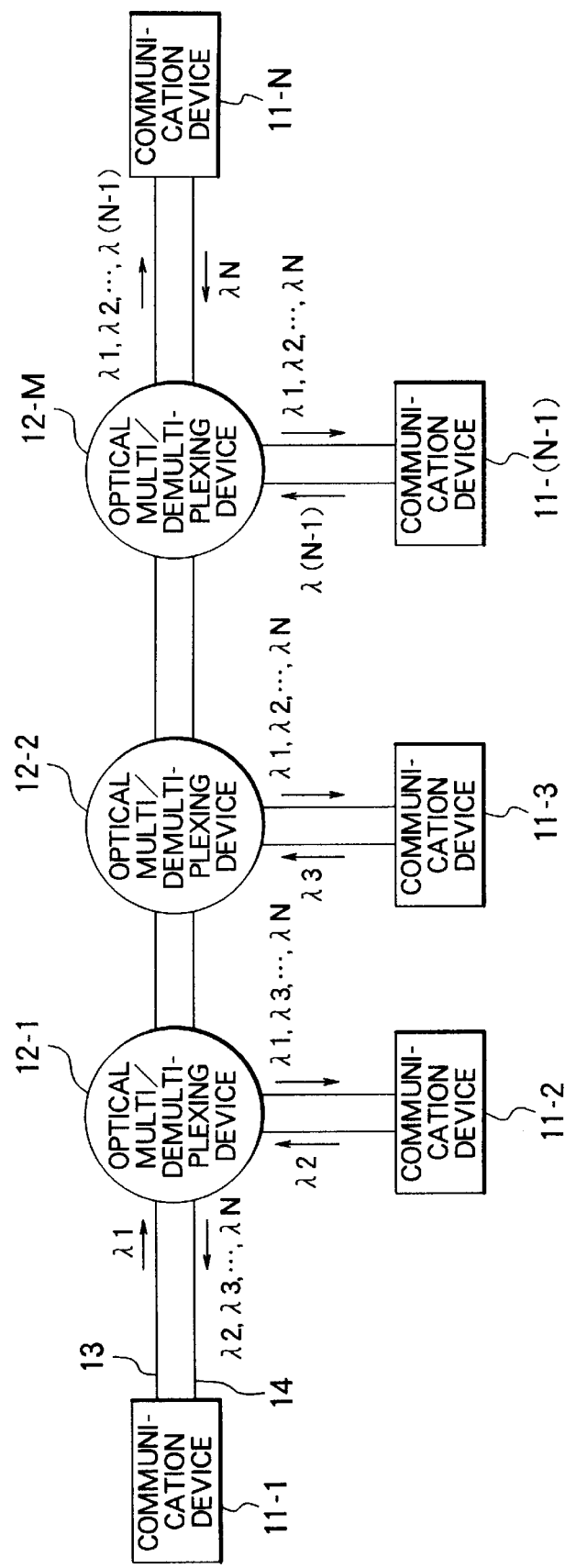
FIG. 1 is a block diagram of a conventional optical network system.

Referring to FIG. 1, a conventional optical network system will be described at first in order to facilitate an understanding of this invention. The illustrated optical network system comprises first through N-th communication devices 11-1 to 11-N, where N represents a positive integer greater than two. The optical network system further comprises first through M-th optical multi/demultiplexing devices 12-1 to 12-M by which the first through the N-th communication devices 11-1 to 11-N are connected to one another, where M represents a positive integer which is not less than one. In the example being illustrated, the particular integer N is equal to (M+2). The first through the N-th communication devices 11-1 to 11-N are connected by the first through the M-th optical multi/demultiplexing devices 12-1 to 12-M through first and second transmission paths 13 and 14. The first through the N-th communication devices 11-1 to 11-N produces first through N-th optical signal having first through N-th wavelengths λ 1 to λ N, respectively.

The first communication device 11-1 transmits the first optical signal of the first wavelength λ 1 to the first optical multi/demultiplexing device 12-1 through first transmission path 13. The second communication device 11-2 transmits the second optical signal of the second wavelength λ 2 to the first optical multi/demultiplexing device 12-1 through first transmission path 13. The first optical multi/demultiplexing device 12-1 multiplexes the first and the second optical signals by wavelength division multiplexing (WDM) to produce a first primary multiplexed signal having the first and the second wavelengths λ 1 and λ 2. The first optical multi/demultiplexing device 12-1 transmits the first primary multiplexed signal to the second optical multi/ demultiplexing device 12-2 through the first transmission path 13.

The third communication device 11-3 transmits the third optical signal of the third wavelength λ 3 to the second optical multi/demultiplexing device 12-2 through first transmission path 13. The second optical multi/demultiplexing device 12-2 multiplexes the first primary multiplexed signal and the third optical signal by WDM to produce a second primary multiplexed signal having the first through the third wavelengths λ 1 to λ 3.

As readily understood from the above description, the (N−1)-th communication device 11-(N−1) transmits the (N−1)-th optical signal of the (N−1)-th wavelength λ (N−1) to the M-th optical multi/demultiplexing device 12-M through first transmission path 13. The M-th optical multi/ demultiplexing device 12-M produces an M-th primary multiplexed signal having the first through the (N−1)-th wavelengths λ 1 to λ (N−1). The M-th primary multiplexed signal is supplied to the N-th communication device 11-N through the first transmission path 13.

Similarly, the N-th communication device 11-N transmits the N-th optical signal of the N-th wavelength λ N to the M-th optical multi/demultiplexing device 12-M through second transmission path 14. When the M-th optical multi/ demultiplexing device 12-M is supplied with the (N−1)-th optical signal, the M-th optical multi/demultiplexing device 12-M produces a first subsidiary multiplexed signal having the N-th and the (N−1)-th wavelengths λ N and λ (N−1). The first subsidiary multiplexed signal is supplied to the (M−1)-th optical multi/demultiplexing device (not shown) through the second transmission path 14.

As readily understood from the above description, the second optical multi/demultiplexing device 12-2 is supplied with an (M−2)-th subsidiary multiplexed signal having the fourth through the N-th wavelengths λ 4 to λ N. The second optical multi/demultiplexing device 12-2 produces an (M−1)-th subsidiary multiplexed signal having the third through the N-th wavelengths λ 3 to λ N. The (M−1)-th subsidiary multiplexed signal is supplied to the first optical multi/demultiplexing device 12-1 through the second transmission path 14. The first optical multi/demultiplexing device 12-1 produces an M-th subsidiary multiplexed signal having the second through the N-th wavelengths λ 2 to λ N. The M-th subsidiary multiplexed signal is supplied to the first communication device 11-1 through the second transmission path 14.

Figure 2:
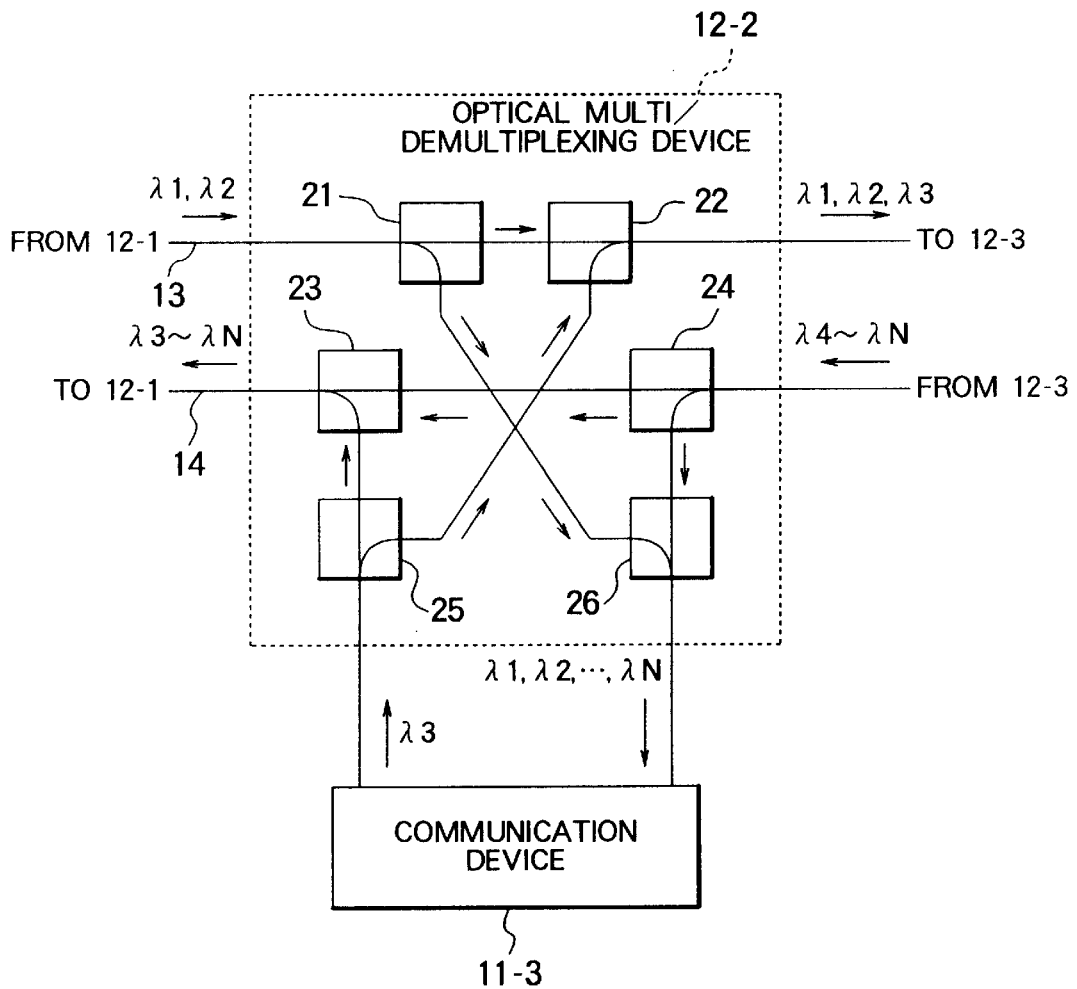
FIG. 2 is a view for describing an optical multi/demultiplexing device illustrated in FIG. 1.

Referring to FIG. 2 in addition to FIG. 1, attention will be directed to the second optical multi/demultiplexing device 12-2. The second optical multi/demultiplexing device 12-2 first through sixth optical multi/demultiplexing circuits 21 to 26. The fifth and the sixth optical multi/demultiplexing circuits; 25 and 26 are connected to the communication device 11-3. The fifth optical multi/demultiplexing circuit 25 is connected to the second and the third optical multi/ demultiplexing circuit 22 and 23. The sixth optical multi/ demultiplexing circuit 26 is connected to the first and the fourth optical multi/demultiplexing circuit 21 and 24. The first and the second optical multi/demultiplexing circuits 21 and 22 are connected to each other and are connected to the first transmission path 13. Similarly, the third and the fourth optical multi/demultiplexing circuits 23 and 24 are connected to each other and are connected to the second transmission path 14.

Each of the first through the M-th optical multi/ demultiplexing devices 12-1 to 12-M has a structure similar to that of the second optical multi/demultiplexing device 12-2.

As described in conjunction to FIG. 1, the second optical multi/demultiplexing device 12-2 is supplied with the first primary multiplexed signal and the (M−2)-th subsidiary multiplexed signal. Supplied with first primary multiplexed signal, the first optical multi/demultiplexing circuit 21 carries out branching of the first primary multiplexed signal to deliver the first primary multiplexed signal to the second and the sixth optical multi/demultiplexing circuits 22 and 26. Supplied with the (M−2)-th subsidiary multiplexed signal, the fourth optical multi/demultiplexing circuit 24 carries out branching of the (M−2)-th subsidiary multiplexed signal to deliver the (M−2)-th subsidiary multiplexed signal to the third and the sixth optical multi/demultiplexing circuits 23 and 26.

As described above, the third communication device 11-3 supplies the third optical signal to the second optical multi/ demultiplexing device 12-2. Supplied with the third optical signal, the fifth optical. multi/demultiplexing circuit 25 carries out branching of the third optical signal to deliver the third optical signal to the second and the third optical multi/demultiplexing circuits 22 and 23.

The second optical multi/demultiplexing circuit 22 multiplexes the first primary multiplexed signal and the third optical signal into the second primary multiplexed signal to supply the second primary multiplexed signal to the third optical multi/demultiplexing device 12-3 through the first transmission path 13. The third optical multi/demultiplexing circuit 23 multiplexes the (M−2)-th subsidiary multiplexed signal and the third optical signal into the (M−1)-th subsidiary multiplexed signal to supply the (M−1)-th subsidiary multiplexed signal to the first optical multi/demultiplexing device 12-1 through the second transmission path 14. Furthermore, the sixth optical multi/demultiplexing circuit 26 multiplexes the first primary multiplexed signal and the (M−2)-th subsidiary multiplexed signal into a reception multiplexed signal having the wavelengths $\lambda$ 1 to $\lambda$ N except for the third wave length $\lambda$ 3. The reception multiplexed signal is supplied to the third communication device 11-3.

The third communication device 11-3 selects a selected optical signal from the reception multiplexed signal. The selected optical signal is produced by a communication device which communicates with the second communication device. In other words, the third communication device 11-3 selectively receives the selected optical signal from the reception multiplexed signal.

As readily understood from the above description, the first communication device 11-1 is supplied with a reception signal having wavelengths $\lambda$ 2 to $\lambda$ N. The N-th communication device 11-N is supplied with a reception signal having wavelengths $\lambda$ 1 to $\lambda$ (N−1). Namely, an n-th communication device 11-n is supplied with a reception signal having wavelengths $\lambda$ 1 to $\lambda$ N except for a wavelength $\lambda$ n, where n is a variable between one and N, both inclusive.

Inasmuch as each of first through the N-th communication devices 11-1 to 11-N selectively receives the selected optical signal from the reception multiplexed signal, each of the communication devices 11-1 to 11-N has a complex structure. In other words, it is difficult to construct an optical network system comprising a plurality of communication devices each of which has a simple structure.

Figure 3:
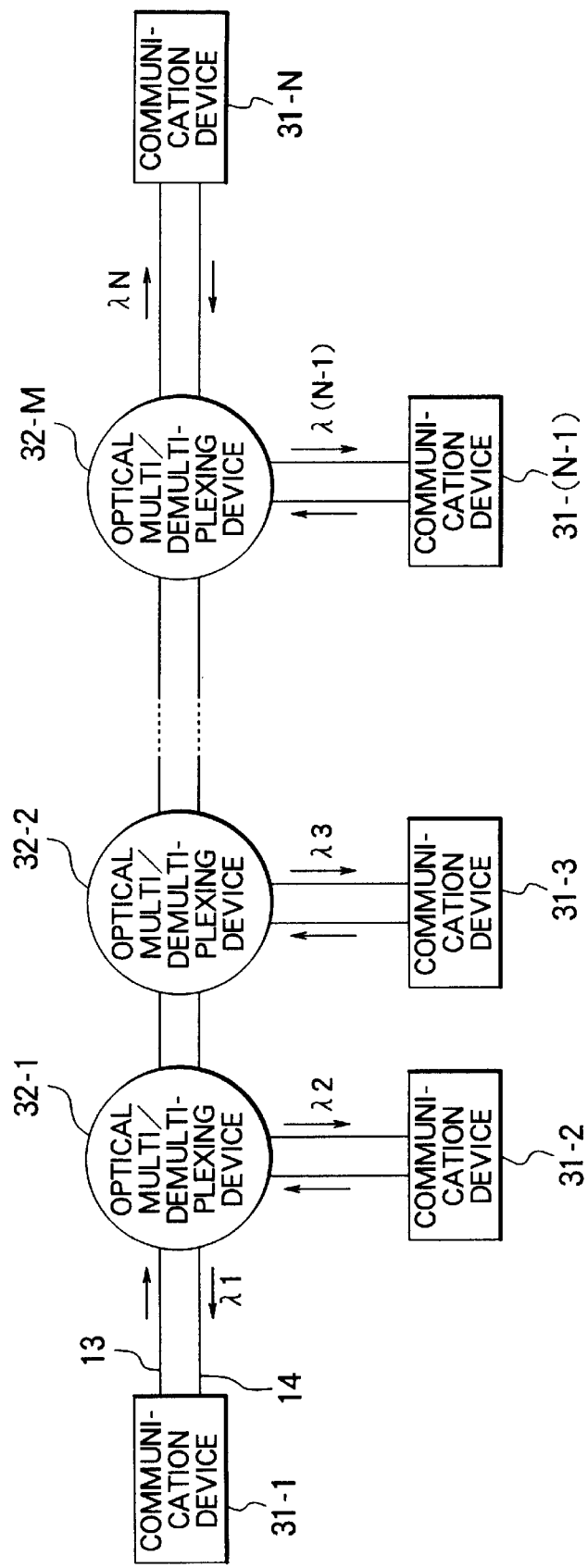
FIG. 3 is a block diagram of an optical network system according a first embodiment of this invention.

Referring to FIG. 3, description will proceed to an optical network system according to a first embodiment of this invention. The illustrated optical network system comprises first through N-th communication devices. The first through the N-th communication devices illustrated in FIG. 3 are different in structure from the first through the N-th communication devices 11-1 to 11-N illustrated in FIG. 1 and are therefore designated by reference numerals 31-1 to 31-N. The optical network system further comprises first through M-th optical multi/demultiplexing devices. The first through the M-th optical multi/demultiplexing devices illustrated in FIG. 3 are different in structure from the first through the M-th optical multi/demultiplexing devices 12-1 to 12-M illustrated in FIG. 1 and are designated by reference numerals 32-1 to 32-M.

An n-th communication device 31-n produces a k-th optical signal having a k-th wavelength $\lambda$ k, where k is not equal to the variable n and is a variable between one and N, both inclusive. The n-th communication device 31-n receives the n-th optical signal as will be described later. More specifically, the first communication device 31-1 produces the N-th optical signal when the first communication device 31-1 communicates with the N-th communication device 31-N. The first communication device 31-1 produces the second through (N−1)-th optical signals when the first communication device 31-1 communicates with the second through the (N−1)-th communication devices 31-2 to 31-(N−1), respectively. In a manner similar to above description, each of the second through the N-th communication devices 31-2 to 31-N selectively produces the first through the N-th optical signals in order to communicate with first through N-th communication devices, respectively.

Figure 4:
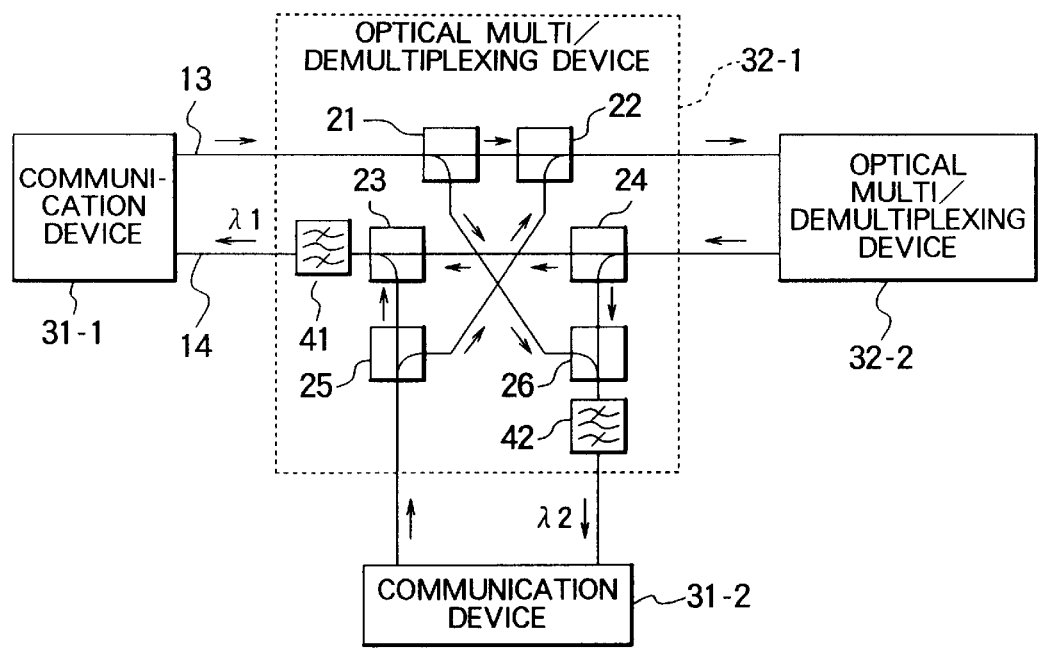
FIG. 4 is a view for describing a first example of an optical multi/demultiplexing device illustrated in FIG. 3.

Referring to FIG. 4, attention will be directed to the first optical multi/demultiplexing device 32-1. The first optical multi/demultiplexing device 32-1 comprises similar parts which are designated by like reference numerals and operable with likewise named signals. The first optical multi/demultiplexing device 32-1 further comprises first and second band-pass filter 41 and 42. The first band-pass filter 41 is connected to the first communication device 31-1 through the second transmission path 14 and is connected to the third optical multi/demultiplexing circuit 23. The second band-pass filter 42 is connected to the sixth optical multi/demultiplexing circuit 26 and the second communication device 31-2. In the first optical multi/demultiplexing device 32-1, the first band-pass filter 41 allows the first optical signal to pass therethrough in order to supply the first optical signal to the first communication device 31-1. In order to supply the second optical signal to the second communication device 31-2, the second band-pass filter 42 allows the second optical signal to pass therethrough.

The M-th optical multi/demultiplexing device 32-M is similar in structure to the first optical multi/demultiplexing device 32-1. In the M-th optical multi/demultiplexing device 32-M, the first band-pass filter 41 allows the N-th optical signal to pass therethrough in order to supply the N-th optical signal to the N-th communication device 31-N. In order to supply the (N−1)-th optical signal to the (N−1)-th communication device 31-(N−1), the second band-pass filter 42 allows the (N−1)-th optical signal to pass therethrough.

Figure 5:
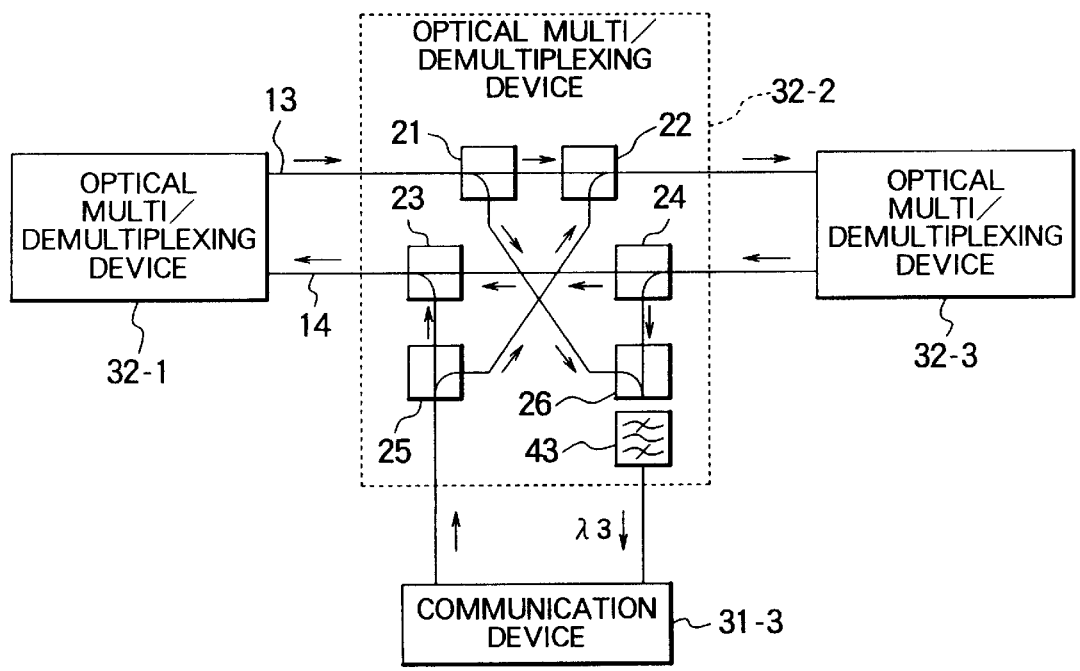
FIG. 5 is a view for describing a second example of an optical multi/demultiplexing device illustrated in FIG. 3.

Referring to FIG. 5, attention will be directed to the second optical multi/demultiplexing device. The second optical multi/demultiplexing device 32-2 comprises similar parts which are designated by like reference numerals and operable with likewise named signals. The second optical multi/demultiplexing device 32-2 further comprises a band-pass filter 43. The band-pass filter 43 is connected to the sixth optical multi/demultiplexing circuit 26 and the third communication device 31-3. In the second optical multi/demultiplexing device 32-2, the band-pass filter 43 allows the third optical signal to pass therethrough in order to supply the third optical signal to the third communication device 31-3.

Each of the third through the (M−1)-th optical multi/demultiplexing devices 32-3 to 32-(M−1) is similar in structure to the second optical multi/demultiplexing device 32-2. The third through the (M−1)-th optical multi/demultiplexing devices 32-3 to 32-(M−1) supply the fourth through the (N−2)-th optical signals to the fourth through the (N−2)-th communication devices 31-4 to 31-(N−2), respectively.

As readily understood from the above description, the first through the N-th communication devices 31-1 to 31-N are supplied with the first through the N-th optical signals, respectively. It is possible to for the first through the N-th communication devices 31-1 to 31-N to receive the first through the N-th optical signals, respectively. Accordingly, the first through the N-th communication devices 31-1 to 31-N has a simple structure. In other words, it is possible to construct the optical network system with a simple structure.

Figure 6:
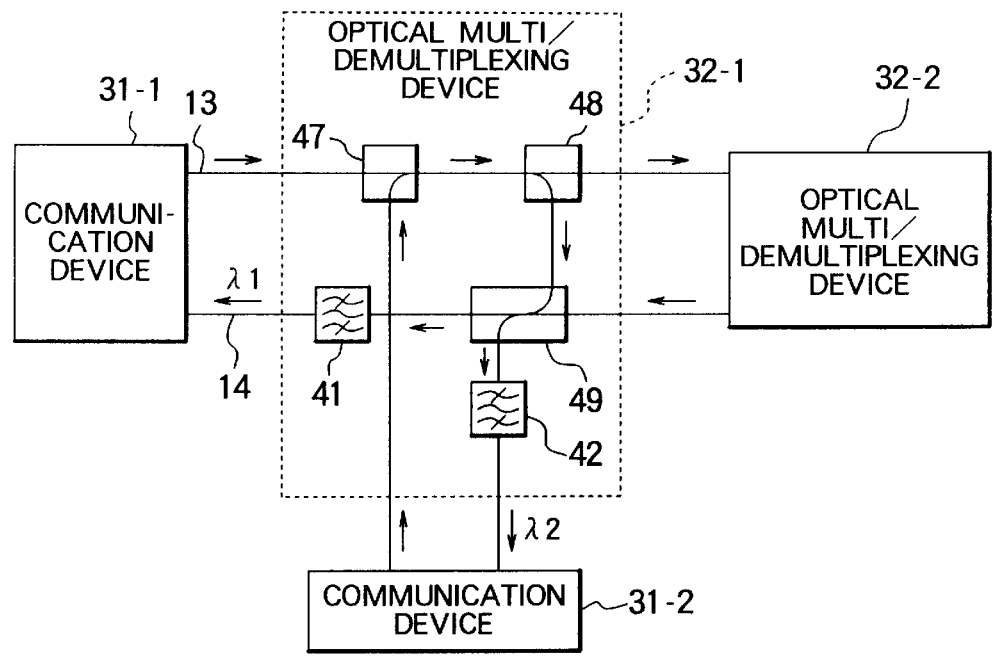
FIG. 6 is a view for describing a third example of an optical multi/demultiplexing device illustrated in FIG. 3.

The first optical multi/demultiplexing device 32-1 may comprise a structure illustrated in FIG. 6 instead of the structure illustrated in FIG. 4. Referring to FIG. 6, the first optical multi/demultiplexing device 32-1 comprises seventh through ninth optical multi/demultiplexing circuits 47 to 49 and the first and the second band-pass filters 41 and 42. The seventh optical multi/demultiplexing circuit 47 is connected to the first and the second communication devices 31-1 and 31-2 and the eighth optical multi/demultiplexing circuit 48. The eighth optical multi/demultiplexing circuit 48 is connected to the second optical multi/demultiplexing device 32-2 and the ninth optical multi/demultiplexing circuit 49. The ninth optical multi/demultiplexing circuit 49 is connected to the second optical multi/demultiplexing device 32-2. Furthermore, the ninth optical multi/demultiplexing circuit 49 is connected to the first and the second communication devices 31-1 and 31-2 through the first and the second band-pass filters 41 and 42, respectively.

The M-th optical multi/demultiplexing device 32-M may comprise the structure illustrated in FIG. 6. In this case, the first band-pass filter 41 and the seventh optical multi/demultiplexing circuit 47 is connected to the N-th communication device 31-N. The second band-pass filter 42 and the seventh optical multi/demultiplexing circuit 47 is connected to the (N−1)-th communication device 31-(N−1). In addition, the eighth and ninth optical multi/demultiplexing circuits 48 and 49 is connected to the (M−1)-th optical multi/demultiplexing device 32-(M−1).

Figure 7:
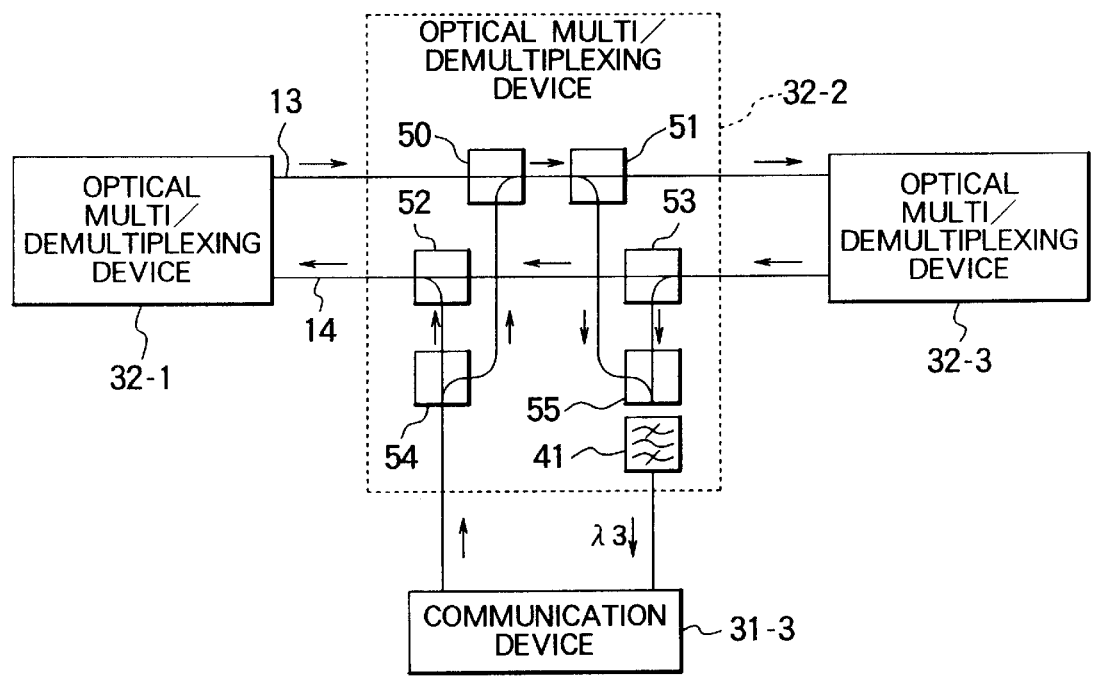
FIG. 7 is a view for describing a fourth example of an optical multi/demultiplexing device illustrated in FIG. 3.

The second optical multi/demultiplexing device 32-2 may comprise a structure illustrated in FIG. 7 instead of the structure illustrated in FIG. 5. Referring to FIG. 7, the second optical multi/demultiplexing device 32-2 comprises tenth through fifteenth optical multi/demultiplexing circuits 50 to 55 and the first band-pass filter 41. The tenth optical multi/demultiplexing circuit 50 is connected to the first optical multi/demultiplexing device 32-1, the eleventh optical multi/demultiplexing circuit 51, and the fourteenth optical multi/demultiplexing circuit 54. The eleventh optical multi/demultiplexing circuit 51 is connected to the third optical multi/demultiplexing device 32-3 and the fifteenth optical multi/demultiplexing circuit 55. The twelfth optical multi/demultiplexing circuit 52 is connected to the first optical multi/demultiplexing device 32-1, the thirteenth optical multi/demultiplexing circuit 53, and the fourteenth optical multi/demultiplexing circuit 54. The thirteenth optical multi/demultiplexing circuit 53 is connected to the third optical multi/demultiplexing device 32-3 and the fifteenth optical multi/demultiplexing circuit 55. The fourteenth optical multi/demultiplexing circuit 54 is connected to the third communication device 31-3. The fifteenth optical multi/demultiplexing circuit 55 is connected to the third communication device 31-3 through the first band-pass filter 41.

Each of the third through the (M−1)-th optical multi/demultiplexing devices 32-3 to 32-(M−1) may be similar in structure to the second optical multi/demultiplexing devices 32-2 illustrated in FIG. 7. The first band-pass filter 41 is connected to the fourth through the (N−2)-th communication devices 31-4 to 31-(N−2) in the third through the (M−1)-th optical multi/demultiplexing devices 32-3 to 32-(M−1), respectively.

Even if each of the first through the M-th optical multi/demultiplexing devices 32-1 to 32-M is constructed as described in conjunction with FIGS. 6 and 7, it is possible to supply the first through the N-th optical signals to the first through the M-th communication devices 31-1 to 31-N, respectively.

Figure 8:
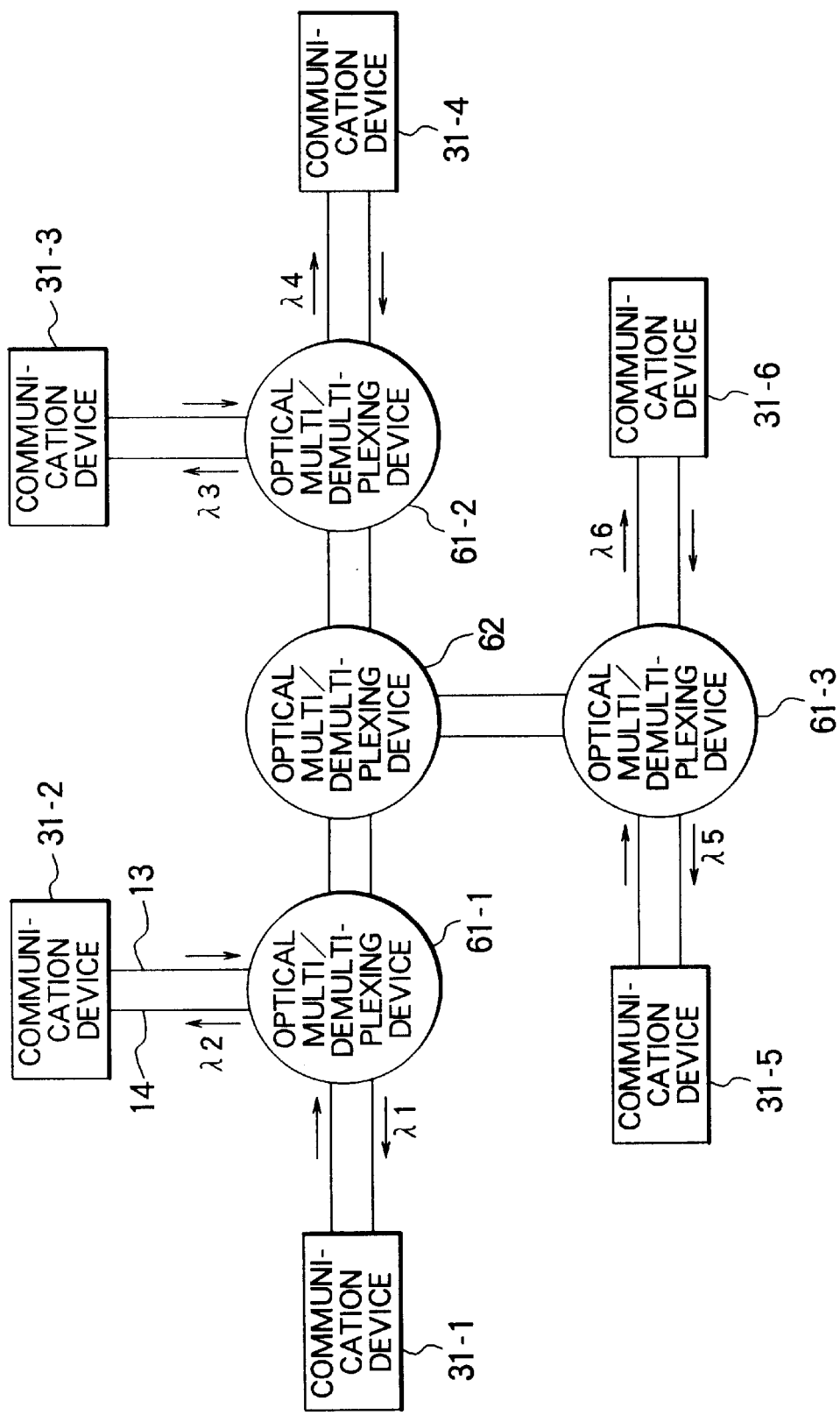
FIG. 8 is a block diagram of an optical network system according a second embodiment of this invention.

Referring to FIG. 8, description will proceed to an optical network system according to a second embodiment of this invention. The illustrated optical network system comprises the first through the N-th communication devices 31-1 to 31-N. In the example being illustrated, the positive integer is equal to six. The optical network system further comprises first through third primary optical multi/demultiplexing devices 61-1 to 61-3 and a subsidiary optical multi/demultiplexing device 62. The first through the sixth communication devices 31-1 to 31-6 are connected to one another by the the first through the third primary optical multi/demultiplexing devices 61-1 to 61-3 and the subsidiary optical multi/demultiplexing device 62.

More particularly, the first and the second communication devices 31-1 and 31-2 are connected to the first primary optical multi/demultiplexing device 61-1 through the first and the second transmission paths 13 and 14. The third and the fourth communication devices 31-3 and 31-4 are connected to the second primary optical multi/demultiplexing device 61-2 through the first and the second transmission paths 13 and 14. The fifth and the sixth communication devices 31-5 and 31-6 are connected to the third primary optical multi/demultiplexing device 61-3 through the first and the second transmission paths 13 and 14. The first through the third primary optical multi/demultiplexing devices 61-1 and 61-3 are connected to one another by the subsidiary optical multi/demultiplexing device 62 through the first and the second transmission paths 13 and 14.

Each of the first through the third primary optical multi/demultiplexing devices 61-1 and 61-3 is similar in structure to the optical multi/demultiplexing device illustrated in FIG. 4 or FIG. 6. The subsidiary optical multi/demultiplexing device 62 is similar in structure to the optical multi/demultiplexing device illustrated in FIG. 2.

As described in conjunction with FIG. 3, the first through the sixth communication devices 31-1 to 31-6 receive the first through the sixth optical signals, respectively. Each of the first through the sixth communication devices 31-1 to 31-6 selectively produces the first through the sixth optical signals in order to communicate with one of the first through the sixth communication devices 31-1 to 31-6.

It will be assumed that each of the first through the third primary optical multi/demultiplexing devices 61-1 and 61-3 is similar in structure to the optical multi/demultiplexing device illustrated in FIG. 4. Each of the first through the third primary optical multi/demultiplexing devices 61-1 and 61-3 comprises the first and the second band-pass filter 41 and 42 illustrated in FIG. 4. For example, the first and the second band-pass filter 41 and 42 are connected to the first and the second communication devices 31-1 and 31-2 in the first primary optical multi/demultiplexing device 61-1. In as much as the subsidiary optical multi/demultiplexing device 62 is similar in structure to the optical multi/demultiplexing device illustrated in FIG. 2, the subsidiary optical multi/demultiplexing device 62 produces a multiplexed signal which has the first through the sixth optical signals. Accordingly, the first primary optical multi/demultiplexing device 61-1 supplies the first and the second optical signals to the first and the second communication devices 31-1 and 31-2, respectively. Similarly, the second primary optical multi/demultiplexing device 61-2 supplies the third and the fourth optical signals to the third and the fourth communication devices 31-3 and 31-4, respectively. The third primary optical multi/demultiplexing device 61-3 supplies the fifth and the sixth optical signals to the fifth and the sixth communication devices 31-5 and 31-6, respectively.

While this invention has thus far been described in conjunction with the preferred embodiments thereof, it will readily be possible for those skilled in the art to put this invention into practice in various other manners.

What is claimed is:

1. An optical network system for use in carrying out an optical communication by wavelength division multiplexing and comprising:
    a plurality of communication devices for communicating with one another;
    a plurality of optical multi/demultiplexing devices connected to one another for connecting said communication devices to one another,
    a plurality of optical signals are assigned as assigned optical signals to said communication devices, respectively, said optical signals having wavelengths different from one another,
    at least one of said communication devices being connected as a connection communication device to each of said multi/demultiplexing devices; and
    each of said optical multi/demultiplexing devices comprising,
    supplying means for supplying said connection communication device with a specific one of said assigned optical signals that is assigned to said connection communication device, and
    distributing means for distributing said assigned optical signals to an adjacent optical multi/demultiplexing device adjacent to each of said optical multi/demultiplexing devices.

2. An optical network system as claimed in claim 1, said supplying means comprises a band-pass filter for allowing said specific assigned optical signal to pass therethrough and for supplying said specific assigned optical signal to said connection communication device.

3. An optical network system for use in carrying out an optical communication by wavelength division multiplexing and comprising first through M-th optical multi/demultiplexing devices and first through (M+2)-th communication devices, where M represents a positive integer greater than one, said first through said M-th optical multi/demultiplexing devices being connected in cascade to one another in an ascending order, said first optical multi/demultiplexing device being connected to said first and said second communication devices, said second through said (M−1)-th optical multi/demultiplexing devices being connected said third through said M-th communication devices, respectively, said M-th optical multi/demultiplexing device being connected to said (M+1)-th and said (M+2)-th communication devices, wherein:
    first through (M+2)-th optical signals are assigned to said first through said (M+2)-th communication devices, respectively, said first through said (M+2)-th optical signals having first through (M+2)-th wavelengths different from one another;
    said first optical multi/demultiplexing device comprising
        first supplying means for supplying said first and said second optical signals to said first and said second communication devices, respectively; and
        first distributing means for distributing said first through said (M+2)-th optical signals to said second optical multi/demultiplexing device;
    a k-th optical multi/demultiplexing device comprising, where k is a variable between two and (M−1), both inclusive;
    second supplying means for supplying a (k+1)-th optical signal to a (k+1)-th communication device; and
    second distributing means for distributing said first through said (M+2)-th optical signals to (k−1)-th and (k+1)-th optical multi/demultiplexing device; and
    said M-th optical multi/demultiplexing device comprising
        third supplying means for supplying said (M+1)-th and said (M+2)-th optical signals to said (M+1)-th and said (M+2)-th communication devices, respectively; and
        third distributing means for distributing said first through said (M+2)-th optical signals to said (M−1)-th optical multi/demultiplexing device.

4. An optical network system as claimed in claim 3, wherein said first supplying means comprises:
    a first band-pass filter for allowing said first optical signal to pass therethrough and for supplying said first optical signal to said first communication device; and
    a second band-pass filter for allowing said second optical signal to pass therethrough and for supplying said second optical signal to said second communication device.

5. An optical network system as claimed in claim 4, said second supplying means comprises a (k+1)-th band-pass filter for allowing said (k+1)-th optical signal to pass therethrough and for supplying said (k+1)-th optical signal to said (k+1)-th communication device.

6. An optical network system as claimed in claim 5, wherein said third supplying means comprises:
    an (M+1)-th band-pass filter for allowing said (M+1)-th optical signal to pass therethrough and for supplying said (M+1)-th optical signal to said (M+1)-th communication device; and
    an (M+2)-th band-pass filter for allowing said (M+2)-th optical signal to pass therethrough and for supplying said (M+2)-th optical signal to said (M+2)-th communication device.

7. An optical network system for use in carrying out an optical communication by wavelength division multiplexing and comprising a plurality of communication devices for communicating with one another, a plurality of primary optical multi/demultiplexing devices each of which is connected to at least one of said communication devices that is defined as a connection communication device, and at least one subsidiary optical multi/demultiplexing device for connecting said primary optical multi/demultiplexing devices to one another, wherein:
    a plurality of optical signals are assigned as assigned optical signals to said communication devices, respectively, said optical signals having wavelengths different from one another;
    each of said primary optical multi/demultiplexing devices comprising:
        primary supplying means for supplying said connection communication device with a specific one of said assigned optical signals that is assigned to said connection communication device; and
        primary distributing means for distributing said assigned optical signals to a primary adjacent optical multi/demultiplexing device adjacent to each of said primary optical multi/demultiplexing devices; and
    said subsidiary optical multi/demultiplexing devices comprising subsidiary distributing said assigned optical signals to a subsidiary adjacent optical multi/demultiplexing device adjacent to said subsidiary optical multi/demultiplexing device.

8. An optical network system as claimed in claim 7, wherein said primary supplying means comprises a primary band-pass filter for allowing said specific optical signal to pass therethrough and for supplying said specific optical signal to said connection communication device.

* * * * *